United States Patent
Lee et al.

(10) Patent No.: US 7,623,453 B2
(45) Date of Patent: Nov. 24, 2009

(54) AGGREGATION SWITCH APPARATUS FOR BROADBAND SUBSCRIBERS

(75) Inventors: Hyoung Il Lee, Daejon (KR); Jeong Hee Lee, Daejon (KR); Bhum Cheol Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 671 days.

(21) Appl. No.: 11/119,094

(22) Filed: Apr. 29, 2005

(65) Prior Publication Data

US 2006/0133274 A1 Jun. 22, 2006

(30) Foreign Application Priority Data

Dec. 16, 2004 (KR) .................. 10-2004-0106836

(51) Int. Cl.
*H04L 12/26* (2006.01)
(52) U.S. Cl. .................. 370/231; 370/420; 370/429; 370/432; 370/440; 370/468
(58) Field of Classification Search .................. 370/230, 370/394.4, 412, 235
See application file for complete search history.

(56) References Cited

U.S. PATENT DOCUMENTS 5,687,095 A * 11/1997 Haskell et al. ........... 348/386.1
6,310,882 B1 10/2001 Lorenz et al.
6,658,016 B1 12/2003 Dai et al.
7,408,930 B2 * 8/2008 Pathi et al. .................. 370/389
2005/0249220 A1 * 11/2005 Olsen et al. .............. 370/395.4

OTHER PUBLICATIONS

Lau, Gigabit Ethernet Switches Using a Shared Buffer Architecture, IEEE Communications Magazine o Dec. 2003.*
Michael V. Lau et al., "Gigabit Ethernnet Switches Using a Shared Buffer Architecture", IEEE Communications Magazine, Dec. 2003, pp. 76-84.

* cited by examiner

*Primary Examiner*—Seema S Rao
*Assistant Examiner*—Henry Baron
(74) *Attorney, Agent, or Firm*—Blakely, Sokoloff, Taylor & Zafman LLP

(57) ABSTRACT

An aggregation switch apparatus for broadband subscribers is disclosed. The apparatus includes: an upstream input buffering unit for buffering packets from more than one subscriber link; a scheduling unit for aggregating the packets to more than one upstream link and scheduling a transfer order; a rate match buffering unit for buffering a transfer rate difference between an output of the upstream input buffering unit and an output of more than one upstream link; a downstream destination identifying unit for identifying a destination of more than one subscriber link of the packets; a broadcasting unit for transferring the packets to terminals of the broadcasting unit; a packet selecting unit for selecting a corresponding packet by identifying a destination port of more than one subscriber link of the packets; and a downstream output buffering unit for buffering the packets outputted from the packet selecting unit to said more than one subscriber link.

32 Claims, 8 Drawing Sheets

AGGREGATION SWITCH APPARATUS FOR BROADBAND SUBSCRIBERS

FIELD OF THE INVENTION

The present invention relates to an aggregation switch apparatus for effectively aggregating, switching and broadcasting data of subscribers with a wide range of bandwidths at a broadband network of which upstream and downstream traffic are asymmetrical; and, more particularly, to an aggregation switch apparatus for broadband subscribers for effectively processing downstream broadcasting traffic while numerous broadband subscribers are accommodated with the aggregation switch apparatus.

DESCRIPTION OF THE PRIOR ART

There has been a great advancement in a transfer rate of the Internet year by year, and on the basis of this great advancement, innovative multimedia services such as digital broadcasting, video on demand (VOD), videophone, video conference, and the like are ready to be commercialized. To provide Voice over Internet Protocol (VoIP), broadcasting and other multimedia services along with traditional data services, it is also essential to provide Quality of Service (QoS) by distinguishing real-time traffic as well as to provide transfer bandwidth of broadband for each subscriber.

A technology of x digital subscriber lines (DSL) using a regular telephone line which is a precedent subscriber network technology and a technology of hybrid fiber coaxial (HFC) using coaxial cables are sufficient to provide bandwidth from 1 to 10 Mbps but still have technical limitations in providing a wide range of bandwidth. Thus, there is a high demand on development of a new technology.

One of focused technologies is Ethernet. More specifically, the Ethernet technology has been already commonly used for local area networks (LANs) in current industrial fields, and relevant parts and systems are supplied most cheaply among those technologies related to the Layer 2. Recently, on the basis of the fast Ethernet technology implemented to massive residential units, there have been frequent incidences of configuring subscriber networks by using Ethernet switches, which are typically used for constructing LANs. However, these Ethernet switches are specifically designed for LANs and thus, being ineffective in respect of function and performance for processing subscriber traffic.

The subscriber traffic exhibits a non-uniform destination distribution. Especially, there barely exists traffic between subscribers at a subscriber network. Being different from subscribers connected through LANs, those subscribers associated with one subscriber network do not create traffic between the subscribers. The reason for this result is because the subscriber network is not a network for communication between subscribers as like the LAN but a network for getting many subscribers connected through an upper ranked network. Even in extreme cases, some telecommunications operators adjust the Ethernet switch to block subscribers from getting an access to each other for the security purpose. Therefore, the subscriber network includes two major traffic stream types; they are, upstream traffic flowing away from subscribers to an upstream link and downstream traffic flowing away from an upstream link to subscribers.

Also, the upstream traffic and the downstream traffic are asymmetrical. The downstream traffic has a relatively large amount of traffic in comparison with the upstream traffic and is mainly focused to process traffic requiring multicasting transfer such as broadcasting services. On the other hand, although the upstream traffic has a less amount of traffic than that of the downstream traffic, a number of subscriber traffic compete for bandwidth of one upstream link; thus, the upstream traffic is more focused to carry out transfer in correspondence to fairness and priority.

However, currently employed Ethernet switches for configuring subscriber networks based on the traditional Ethernet technology do not fully reflect the above-described subscriber network characteristics. That is, since the Ethernet switch is specifically designed to be suitable for LANs in which inter-subscriber traffic is uniform and symmetric, the currently employed Ethernet switch is ineffective in processing traffic of non-uniform and asymmetric subscriber network. For instance, to configure an Ethernet switch of which port number is N, it is necessary to have N×N switch fabrics. Herein, N is a positive number. However, on the basis of the fact that there barely exists traffic between subscribers, only about (N×1+1×N) of switching capacity is required to accommodate the same number of subscribers.

Also, most of commercially useable Ethernet switching devices are configured in a shared buffer type or a shared bus type. One example of such Ethernet switches is disclosed in an article by M. V. Lau et al., entitled "Gigabit Ethernet Switches Using a Shared Buffer Architecture," *IEEE Communications Magazine*, Vol. 41, issue 12, pp. 76-84, 2003. However, the shared buffer type or shared bus type switch is incapable of accommodating many subscribers with one device since an operation speed of a central buffer or bus is compelled to extend in proportion to the increased number of ports. Detailed configuration and description of the shared buffer type or shared bus type switch is learned from an article by Nick McKeown, "The iSLIP Scheduling Algorithm for Input-Queued Switches," *IEEE/ACM Transactions on Networking*, Vol. 7, pp. 188-201, 1999.

Furthermore, the conventional Ethernet switch has to transmit packets repeatedly as many as the number of destinations in order to process multicasting traffic. Therefore, when the multicasting traffic having a higher priority such as broadcasting traffic occupies a wide range of bandwidth within the Ethernet switch, resources that regular traffic having a lower priority can use significantly decrease and as a result, transfer quality is degraded.

FIG. 1 is a diagram showing a shared buffer switching system typically employed in a conventional Ethernet switch. Especially, FIG. 1 shows the case of configuring a subscriber network with a general Ethernet switch configured in a shared buffer type.

As shown, a shared buffer type Ethernet switch 100 includes a buffer control unit 110 and a shared buffer 120. A number of subscriber links and an upstream link are connected to ports of the shared buffer type Ethernet switch 100 regardless of a traffic characteristic of the subscriber network. Also, packets transferred into the subscriber links and into the upstream link are processed at the buffer control unit 110, and multicasting traffic is processed at the shared buffer 120 through a repetitive reading mode.

Accordingly, it is highly demanded to develop an aggregation switch apparatus for broadband subscribers capable of effectively aggregating, switching and broadcasting data of subscribers with a wide range of bandwidth in a broadband subscriber network of which upstream traffic and downstream traffic are asymmetrical and of accommodating many broadband subscribers by using the same resource.

SUMMARY OF THE INVENTION

It is, therefore, an object of the present invention to provide an aggregation switch apparatus for broadband subscribers for accommodating numerous broadband subscribers with an aggregation switch and effectively processing downstream broadcasting traffic.

It is another object of the present invention to provide an aggregation switch apparatus for effectively aggregating, switching and broadcasting data of broadband subscriber and accommodating broadband subscribers as many as possible.

It is a still another object of the present invention to provide an aggregation switch apparatus for broadband subscribers capable of aggregating upstream traffic of broadband subscribers to one or a plurality of upstream links by accommodating the upstream traffic of broadband subscribers as many as possible, queueing the upstream traffic and scheduling the upstream traffic equally and of effectively aggregating, switching and broadcasting downstream traffic of an access node to many broadband subscribers.

In accordance with an aspect of the present invention, there is provided an aggregation switch apparatus for broadband subscribers, including: an upstream input buffering unit for buffering packets received from more than one subscriber link; a scheduling unit for aggregating the packets stored into the upstream input buffering unit to more than one upstream link and scheduling an order of transfer; a rate match buffering unit for buffering a transfer rate difference between an output of the upstream input buffering unit scheduled by the scheduling unit and an output of said more than one upstream link; a downstream destination identifying unit for identifying a destination of said more than one subscriber link of the packets received from said more than one upstream link; a broadcasting unit for transferring the packets received from the downstream destination identifying unit to terminals of the broadcasting unit; a packet selecting unit for selecting a corresponding packet by identifying a destination port of said more than one subscriber link of the received packets through the broadcasting unit; and a downstream output buffering unit for buffering the packets outputted from the packet selecting unit to said more than one subscriber link.

In accordance with another aspect of the present invention, there is provided an aggregation switch apparatus for broadband subscribers, including: an upstream input buffering unit for buffering packets received from more than one subscriber link; a scheduling unit for aggregating the packets stored into the upstream input buffering unit to more than one upstream link and scheduling an order of transfer; a rate match buffering unit for buffering a transfer rate difference between an output of the upstream input buffering unit scheduled by the scheduling unit and an output of said more than one upstream link; a downstream destination identifying unit for identifying a destination of said more than one subscriber link of the packets received from said more than one upstream link; a broadcasting unit for transferring the packets received from the downstream destination identifying unit to terminals of the broadcasting unit; a packet selecting unit for selecting a corresponding packet by identifying a destination port of said more than one subscriber link of the received packets through the broadcasting unit; and a downstream output buffering unit for buffering the packets outputted from the packet selecting unit to said more than one subscriber link.

In accordance with a still another aspect of the present invention, there is provided an aggregation switch apparatus for broadband subscribers, including: an upstream input buffering unit for buffering packets received from more than one subscriber link; a scheduling unit for aggregating the packets stored into the upstream input buffering unit to more than one upstream link and scheduling an order of transfer; an internal path packet selecting unit for selecting/extracting packets destined to said more than one subscriber link by identifying addresses of the selected packets by the scheduling unit; an internal path buffering unit for buffering the selected packets by the internal path packet selecting unit; a rate match buffering unit for buffering a transfer rate difference between an upstream packet output of the upstream input buffering unit scheduled by the scheduling unit and an output of said more than one upstream link; a downstream destination identifying unit for identifying a destination of said more than one subscriber link of the packets from said more than one upstream link; a broadcasting unit for transferring the packets from one of the internal path buffering unit and the downstream destination identifying unit to terminals of the broadcasting unit; a packet selecting unit for selecting a corresponding packet by identifying a destination port of said more than one subscriber link of the packets received through the broadcasting unit; and a downstream output buffering unit for buffering the packets outputted from the packet selecting unit to said more than one subscriber link.

In accordance with a still another aspect of the present invention, there is provided an aggregation switch apparatus for broadband subscribers, including: an upstream band limiting unit for classifying packets received from more than one subscriber link and limiting a band according to the classification result; an upstream input buffering unit for buffering the packets from the upstream band limiting unit; a scheduling unit for aggregating the packets stored into the upstream input buffering unit to more than one upstream link and scheduling an order of transfer; an internal path packet selecting unit for selecting/extracting packets destined to said more than one subscriber link by identifying addresses of the selected packets by the scheduling unit; an internal path buffering unit for buffering the selected packets by the internal path packet selecting unit; a rate match buffering unit for buffering a transfer rate difference between an upstream packet output of the upstream input buffering unit scheduled by the scheduling unit and an output of said more than one upstream link; a downstream band limiting unit for classifying the packets from said more than one upstream link and limiting a band according to the classification result; a downstream destination identifying unit for identifying a destination of said more than one subscriber link of the packets from downstream band limiting unit; a broadcasting unit for transferring the packets from one of the internal path buffering unit and the downstream destination identifying unit to terminals of the broadcasting unit; a packet selecting unit for selecting a corresponding packet by identifying a destination port of said more than one subscriber link of the packets received through the broadcasting unit; and a downstream output buffering unit for buffering the packets outputted from the packet selecting unit to said more than one subscriber link.

In accordance with a still another aspect of the present invention, there is provided an aggregation switch apparatus for broadband subscribers, including: an upstream input buffering unit for buffering packets received from more than one subscriber link; a scheduling unit for aggregating the packets stored into the upstream input buffering unit to more than one upstream link and scheduling an order of transfer; an upstream destination identifying unit for identifying a destination of said more than one upstream link of the packets selected by the scheduling unit; an upstream output buffering unit for buffering the packets outputted as per destination identified by the upstream destination identifying unit; a downstream destination identifying unit for identifying a destination of said more than one subscriber link of the packets received from said more than one upstream link; a broadcasting unit for transferring the packets from the downstream destination identifying unit to terminals of the broadcasting unit; a packet selecting unit for selecting a corresponding packet by identifying a destination port of said more than one subscriber link of the packets received through the broadcasting unit; and a downstream output buffering unit for buffering the packets outputted from the packet selecting unit to said more than one subscriber link.

In accordance with a still another aspect of the present invention, there is provided an aggregation switch apparatus for broadband subscribers, including: an upstream band limiting unit for classifying packets received from more than one subscriber link and limiting a band according to the classification result; an upstream input buffering unit for buffering the packets from the upstream band limiting unit; a scheduling unit for aggregating the packets stored into the upstream input buffering unit to more than one upstream link and scheduling an order of transfer; an upstream destination identifying unit for identifying a destination of more than one upstream link of the packets selected by the scheduling unit; an upstream output buffering unit for buffering the packets outputted as per destination identified by the upstream destination identifying unit; a downstream band limiting unit for classifying the packets from said more than one upstream link and limiting a band according to the classification result; a downstream destination identifying unit for identifying a destination of said more than one subscriber link of the packets received from the downstream band limiting unit; a broadcasting unit for transferring the packets from the downstream destination identifying unit to terminals of the broadcasting unit; a packet selecting unit for selecting a corresponding packet by identifying a destination port of said more than one subscriber link of the packets from the broadcasting unit; and a downstream output buffering unit for buffering the packets outputted from the packet selecting unit to said more than one subscriber link.

In accordance with a further aspect of the present invention, there is provided an aggregation switch apparatus for broadband subscribers, including: an upstream input buffering unit for buffering packets from more than one subscriber link; a scheduling unit for aggregating the packets stored into the upstream input buffering unit to more than one upstream link and scheduling an order of transfer; an upstream rate match buffering unit for buffering a transfer rate difference between an output of the upstream input buffering unit scheduled by the scheduling unit and an output of said more than one upstream link; a downstream rate match buffering unit for buffering a transfer rate difference between said more than one upstream link and a broadcasting unit; the broadcasting unit for transferring the packets from the downstream rate match buffering unit to terminals of the broadcasting unit; a downstream destination identifying unit for selecting a corresponding packet by identifying a destination of said more than one subscriber link of the packets received through the broadcasting unit; and a downstream output buffering unit for buffering the packets outputted from the downstream destination identifying unit to said more than one subscriber link.

In accordance with a still further aspect of the present invention, there is provided an aggregation switch apparatus for broadband subscribers, including: an upstream band limiting unit for classifying packets from more than one subscriber link and limiting a band according to the classification result; an upstream input buffering unit for buffering the packets received from the upstream band limiting unit; a scheduling unit for aggregating the packets stored into the upstream input buffering unit to more than one upstream link and scheduling an order of transfer; an upstream rate match buffering unit for buffering a transfer rate difference between an output of the upstream input buffering unit scheduled by the scheduling unit and an output of said more than one upstream link; a downstream rate match buffering unit for buffering a transfer rate difference between said more than one upstream link and a broadcasting unit; the broadcasting unit for transferring the packets from the downstream rate match buffering unit to terminals of the broadcasting unit; a downstream destination identifying unit for selecting a corresponding packet by identifying a destination of said more than one subscriber link of the packets received through the broadcasting unit; a downstream band limiting unit for classifying the packets from the downstream destination identifying unit and limiting a band according to the classification result; and a downstream output buffering unit for buffering the packets outputted from the downstream band limiting unit to said more than one subscriber link.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 1:
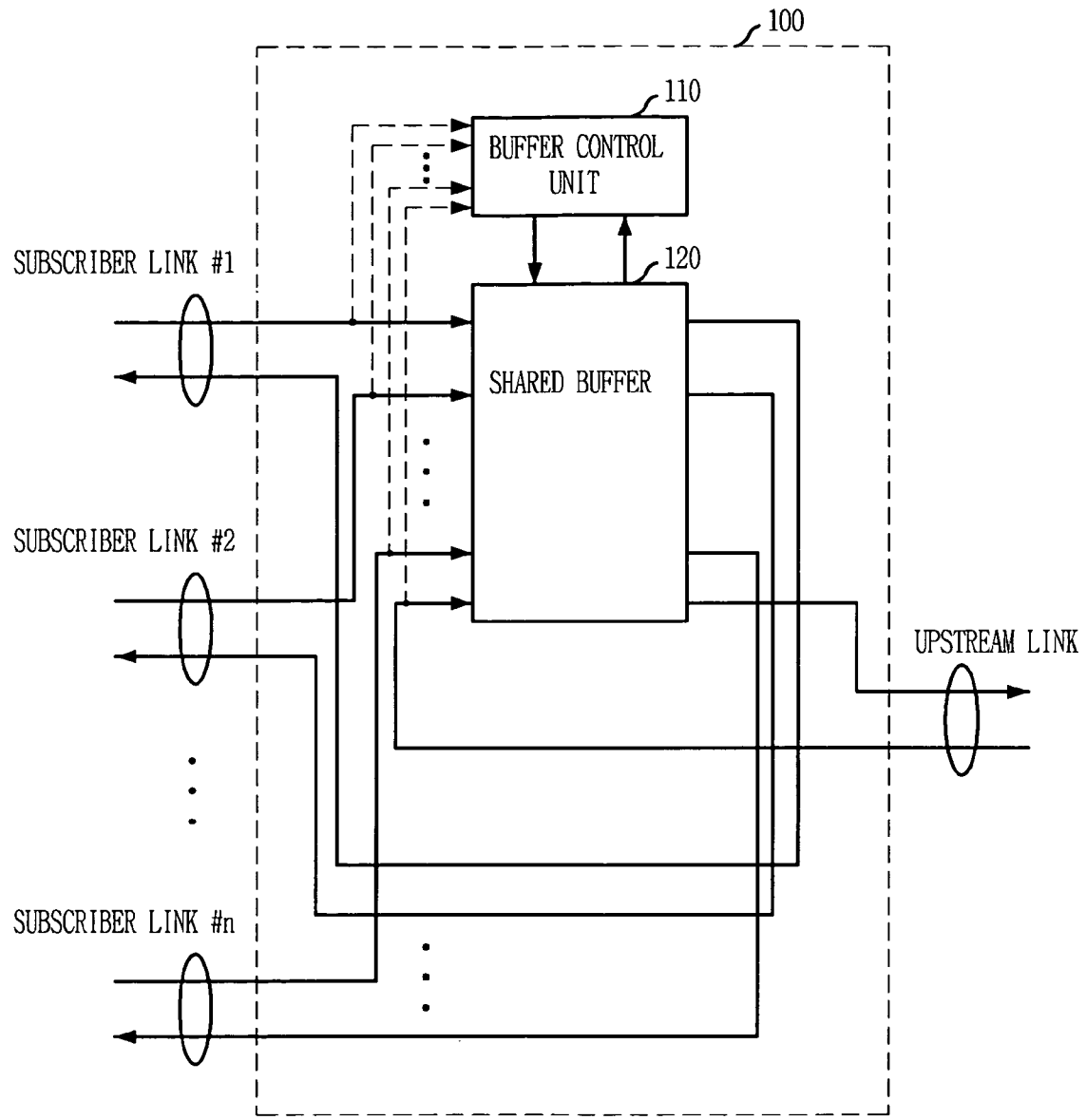
FIG. 1 is a diagram showing a shared buffer type switching system mainly used in a conventional Ethernet switch.
Figure 2:
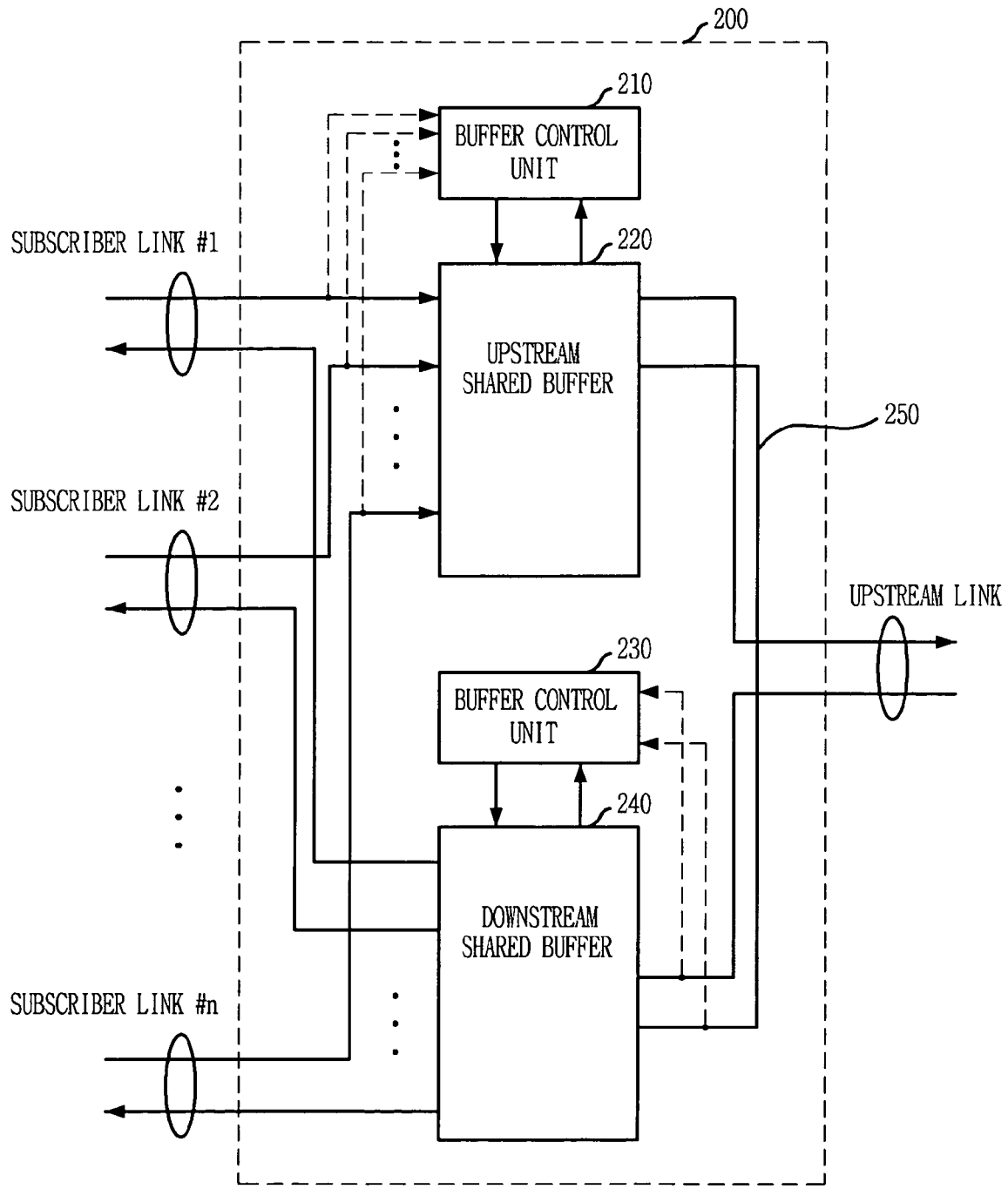
FIG. 2 is a diagram briefly showing a switching system with paths for upstream traffic, downstream traffic and inter-subscriber traffic based on traffic characteristics of a general subscriber network.

FIG. 2 is a diagram of a switching system having paths for upstream traffic, downstream traffic and inter-subscriber traffic depending on traffic characteristics of a regular subscriber network. Particularly, in consideration that subscriber traffic is classified mainly into upstream traffic and downstream traffic and the inter-subscriber traffic rarely exists, an apparatus shown in FIG. 2 is specifically configured to process the upstream traffic and the downstream traffic individually with use of two shared buffers and to process the inter-subscriber traffic by using an internal path.

As illustrated in FIG. 2, a switching device 200 classifying and processing upstream traffic and downstream traffic by using the two shard buffers includes: an upstream shared buffer 220 for storing packets transferred from subscriber links; a first buffer control unit 210 for controlling the upstream shared buffer 220 to output information on headers extracted from the packets transferred from the subscriber links to an upstream link or a downstream shared buffer 240; the downstream shared buffer 240 for storing the packets transferred from the upstream shared buffer 220 or the upstream link; and a second buffer control unit 230 for controlling the downstream shared buffer 240 to determine a destined subscriber link by analyzing information on headers from the upstream shared buffer 220 or the upstream link and output the information based on the determination.

Under this configuration, the upstream traffic is transferred to the upstream link by passing through the upstream shared buffer 220 from a subscriber; the downstream traffic is transferred to the individual subscriber links by passing through the downstream shared buffer 240 from the upstream link; and the inter-subscriber traffic starts from a specific subscriber and is transferred through an internal path 250 at the upstream shared buffer 220 to the downstream shared buffer 240 and finally to a destined subscriber.

According to the configuration illustrated in FIG. 2, the internal path 250 with a narrow range of bandwidth is used to process the inter-subscriber traffic having a less amount of traffic, and the upstream traffic and downstream traffic are separately configured to optimize an operation speed of devices according to required bandwidth.

However, the shared buffers are used for the upstream traffic and the downstream traffic and thus, a required operation speed of the shared buffers increases in proportion to the increased number of subscribers. The upstream shared buffer 220 should be capable of simultaneously storing packets transferred to the subscriber links, and the downstream shared buffer 240 should be capable of simultaneously transferring packets coming to the upstream link to subscriber links in consideration of providing a multicasting service. Since the buffer control unit 210 should process all packets arrived at the subscriber links, there may be a bottleneck problem at this site as the number of subscribers increase.

Figure 3:
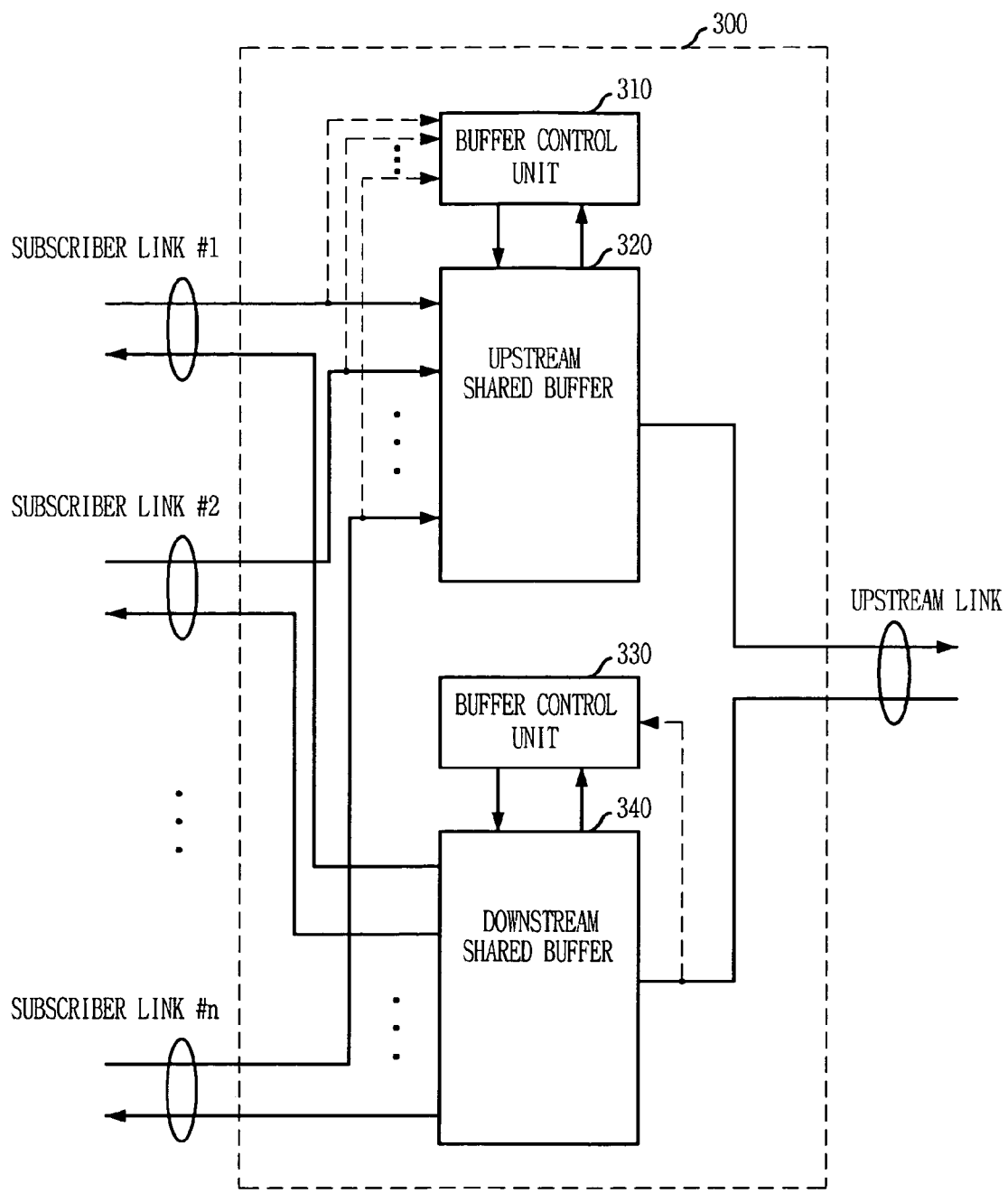
FIG. 3 is a diagram showing a switching system except for the path for the inter-subscriber traffic shown in FIG. 2.

FIG. 3 is a diagram briefly showing a switching system except for a path for the inter-subscriber traffic shown in FIG. 2. Herein, the path for the inter-subscriber traffic is called an internal link.

According to the configuration shown in FIG. 3, the inter-subscriber traffic is first transferred to an upstream link and processed at an upper ranked apparatus provided with a switching function between subscribers. A regular Ethernet switch that processes symmetric traffic and an access router are examples of such upper ranked apparatus.

Figure 4:
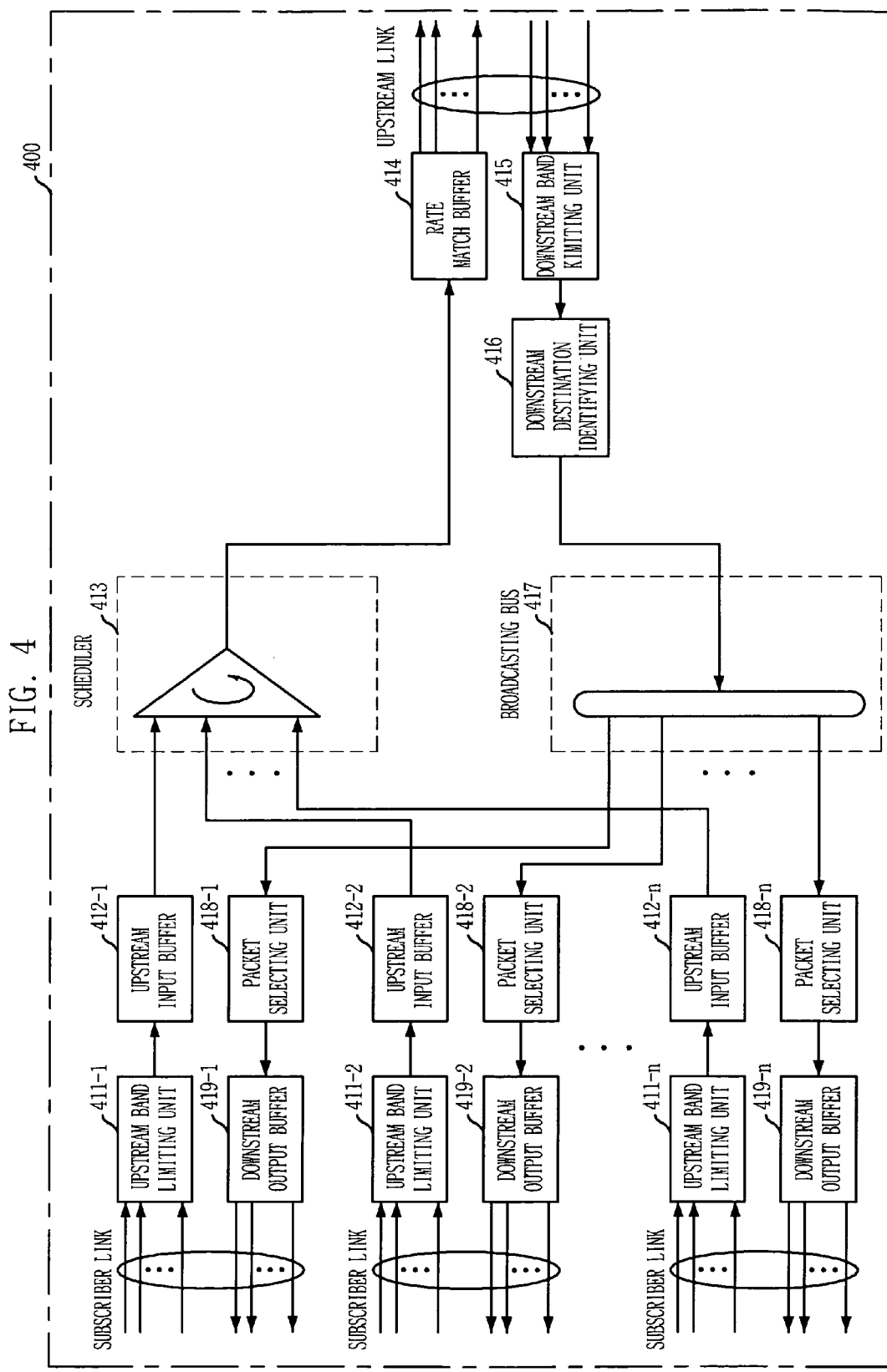
FIG. 4 is a diagram showing a first embodied aggregation switch apparatus for broadband subscribers in accordance with the present invention.

FIG. 4 is a diagram showing a first embodied aggregation switch apparatus for broadband subscribers in accordance with the present invention.

As shown, the aggregation switch apparatus 400 for broadband subscribers processes upstream traffic and downstream traffic separately and has a buffer structure dispersed per one or more than one subscriber link to offer an ease extension.

The aggregation switch apparatus 400 for broadband subscribers includes: a plurality of upstream band limiting units 411-1 to 411-n for classifying packets received from one or a plurality of subscriber links and limiting a band (rate limiting) according to the classification result; a plurality of upstream input buffers 412-1 to 412-n for storing packets received from the upstream band limiting units 411-1 to 411-n until the packets are outputted; a scheduler 413 for aggregating the packets stored into the upstream input buffers 412-1 to 412-n to one or a plurality of upstream links and scheduling an order of transfer; a rate match buffer 414 for buffering a rate difference between outputs of the upstream input buffers 412-1 to 412-n selected by the scheduler 413 and outputs of the upstream links; a downstream band limiting unit 415 for classifying packets received from the upstream links and limiting a band according to the classification result; a downstream destination identifying unit 416 for identifying a destination of the individual subscriber links of the packets received from the downstream band limiting unit 415; a broadcasting bus 417 for transferring the packets received from the downstream destination identifying unit 416 to a plurality of terminals of the broadcasting bus 417; a plurality of packet selecting units 418-1 to 418-n for identifying a destination port of the respective subscriber links of the received packets by being allocated at each terminal of the broadcasting bus 417 and selecting a corresponding packet to each of the packet selecting units 418-1 to 418-n; and a plurality of downstream output buffers 419-1 to 419-n for storing the packets from the packet selection units 418-1 to 418-n until the packets are outputted to the subscriber links. Herein, n is a positive number.

The aggregation switch apparatus 400 for broadband subscribers illustrated in FIG. 4 does not include a path for transferring inter-subscriber traffic within the aggregation switch apparatus 400. Thus, the inter-subscriber traffic is processed at an upper ranked apparatus as described in FIG. 3.

Hereinafter, sequential steps of processing the downstream traffic flowing away from an upstream link to subscribers based on the present invention will be described in detail.

First, when packets are arrived at the upstream link, the downstream band limiting unit 415 classifies the packets referring to information on headers of the packets and limits transfer capacity to a precedently assigned band with respect to a classified traffic flow. That is, if the classified traffic flow transfers a higher amount of packets than the assigned band, the downstream band limiting unit 415 discards the arrived packets. Herein, the downstream band limiting unit 415 is an additional configuration element in this present invention.

Also, the downstream destination identifying unit 416 determines a destination port of a corresponding packet based on Ethernet destination MAC addresses of the packets passed through the downstream band limiting unit 415 and attaches information on this determination to the corresponding packet in the form of a simple tag. If the corresponding packet is a multicasting packet, a tag that identifies a plurality of destinations is attached to the corresponding packet. To perform the above-described operations, the downstream destination identifying unit 416 is mandated to maintain a table in respect of the Ethernet destination MAC addresses corresponding to the individual subscriber ports. Detailed description of the management and maintenance of this table will be provided later.

Afterwards, the packets each attached with the destination identification tag by the downstream destination identifying unit 416 are transferred simultaneously to the packet selecting units 418 to 418-$n$ through the broadcasting bus 417. That is, the broadcasting bus 417 serves a role in broadcasting the received packets to specific destinations.

Then, the individual packet selecting units 418-1 to 418-$n$ first investigate the tags of the arrived packets. After the investigation, the individual packet selecting units 418-1 to 418-$n$ select the packets destined for the correct destination and, pass the selected packets and discard the rest packets.

Afterwards, the selected packets by the packet selecting units 418-1 to 418-$n$ are stored into a plurality of downstream output buffers 419-1 to 419-$n$, which subsequently transfers the stored packets to the corresponding subscriber links by considering priorities among the packets and fairness between subscribers.

Hereinafter, sequential steps of processing upstream traffic flowing away from the subscriber links to the upstream links according to the present invention will be described in detail.

First, when packets are arrived through one of the subscriber links, the upstream band limiting units 411-1 to 411-$n$ classify the packets referring to information on headers of the packets and limits transfer capacity to a precedently assigned band with respect to a classified traffic flow. That is, if the classified traffic flow transfers a higher amount of the packets than the precedently assigned band, the upstream band limiting units 411-1 to 411-$n$ discard the arrived packets. Herein, the upstream band limiting units 411-1 to 411-$n$ are additional configuration elements in the present invention.

Then, the packets passing through the upstream band limiting units 411-1 to 411-$n$ are stored into the upstream input buffers 412-1 to 412-$n$. Afterwards, the packets stored into the upstream band limiting units 411-1 to 411-$n$ are transferred to the rate match buffer 414 of the upstream links according to an order of transfer determined by the scheduler 413. The scheduler 413 determines an order of transfer by considering priorities decided by the upstream band limiting units 411-1 to 411-$n$ and fairness between subscribers.

Also, the rate match buffer 414 is used to temporarily store the packets for the purpose of compensate a transfer rate difference between internal parts of the embodied aggregation switch apparatus and one or a plurality of the upstream links. At this time, unlike the upstream traffic processing, the downstream traffic processing do not include the step of determining a destination port because the destination of the upstream traffic is already determined to be the upstream links. Therefore, in comparison with a typical Ethernet switch that determines destination ports of all packets, the aggregation switch apparatus 400 for broadband subscribers determines the destination ports of those packets arrived at the upstream links. Hence, there is a less burden on processing overhead.

Hereinafter, a method for maintaining and managing a table for determining ports of subscribers based on Ethernet destination MAC addresses by the downstream destination identifying unit 416 will be explained. Herein, this particular table is called a routing table.

Generally, the Ethernet switch generates a routing table through a procedure called address learning or MAC learning. That is, when a packet with a source address comes to one port, the routing table makes a new entry by combining the new source address with said one port. Afterwards, when a packet having the above source address as a destination address arrives at another port, addresses of the routing table is looked up to discover a corresponding port of the packet with the same source address. Also, when an Ethernet packet corresponding to this source address does not enter for a predetermined period, a corresponding entry is deleted from the routing table. These described address learning and address lookup procedures are carried out by using one routing table with respect to all packets arrived at the Ethernet switch.

However, in the aggression switch apparatus 400 for broadband subscribers in FIG. 4, the address lookup procedure is unnecessary with respect to the upstream traffic, and as a result, the address learning process is also unnecessary with respect to the downstream traffic. In other words, the address lookup procedure is required for the downstream traffic, and the address learning procedure is required for the upstream traffic. According to the conventional Ethernet switch, these two procedures are processed based on the same routing table. That is, with respect to the downstream traffic, it is necessary to learn addresses of the packets corresponding to the upstream traffic with reference to the routing table subjected to the address lookup procedure. This scheme necessitates frequent search and entry modification of the routing table, and particularly, when there are lots of subscriber links, a burden on processing overhead increases in proportion to this increased number of subscriber links.

For this reason, in this embodiment of the present invention, the address learning procedure with respect to the upstream traffic and the address lookup procedure with respect to the downstream traffic are carried out by using dispersed source address tables. The source address tables exist within the upstream band limiting units 411-1 to 411-$n$, and each subscriber port, i.e., the subscriber link, is assigned with one source address table. Each of the source address tables investigates source addresses of packets arrived at corresponding subscriber ports, and if the packet with a new address is arrived, a new entry is made to the source address table which subsequently leads the destination routing table existing within the downstream destination identifying unit 416 to learn this newly entered address. If the arrived packet has the same address to the precedently assigned address, the source address table takes no action. Since the packets with the new addresses enter less frequently, the destination routing table requires less processing overhead for the address learning. Also, because the source address tables are assigned for each subscriber port, the source address tables do not have an overlapped entry and thus, size of the table is also small and a burden on the processing overhead is less.

Hereinafter, detailed description of the same configuration and operations described in FIG. 4 will be omitted for those of the foregoing second to fifth embodiments of the present invention.

Figure 5:
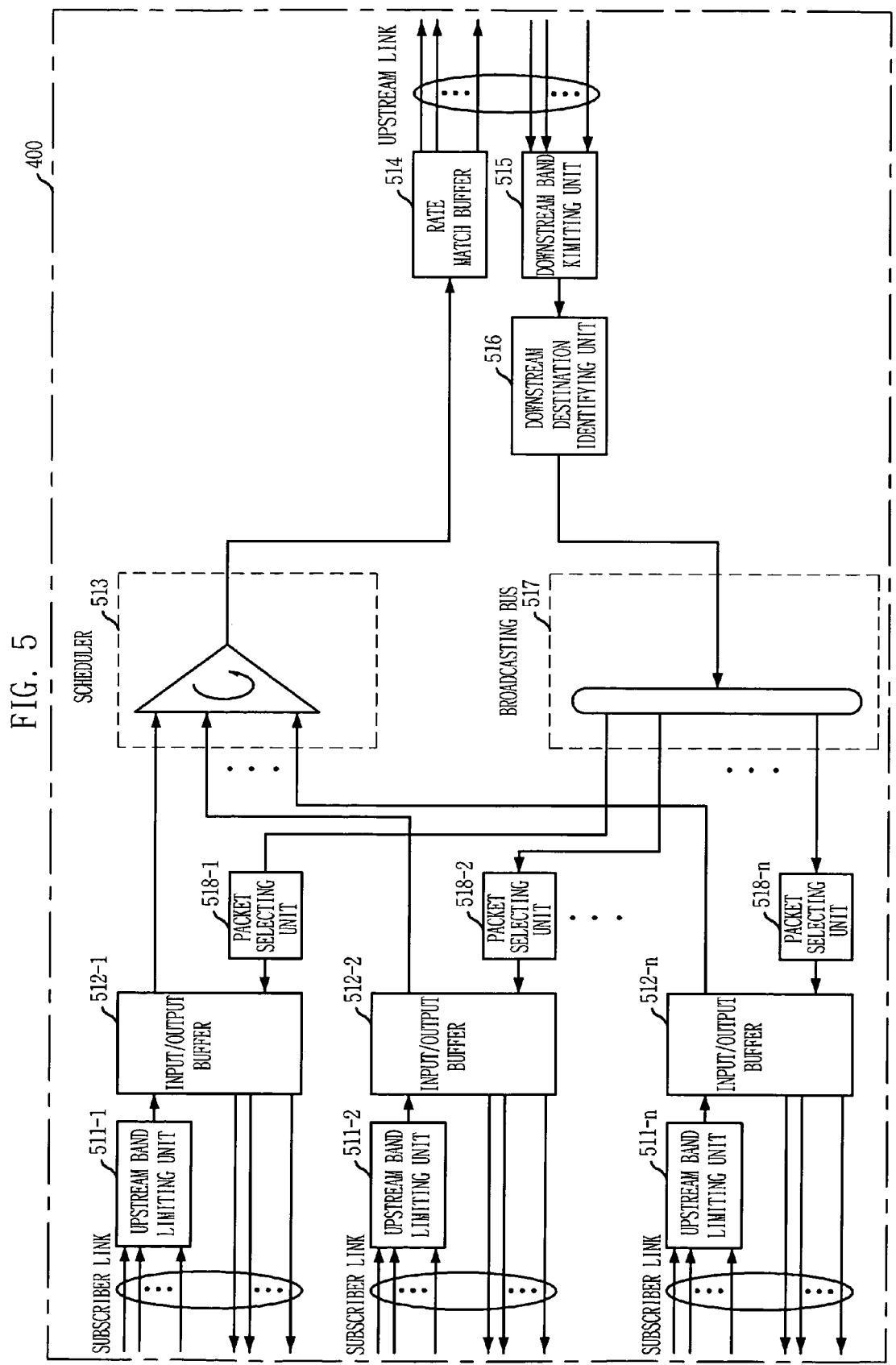
FIG. 5 is a diagram showing a second embodied aggregation switch apparatus for broadband subscribers, wherein an input buffer and an output buffer shown in FIG. 4 are configured to be one shared buffer in accordance with the present invention.

FIG. 5 is a diagram showing a second embodied aggregation switch apparatus for broadband subscribers in accordance with the present invention. Especially, an input buffer and an output buffer are configured as one shared buffer in the aggregation switch apparatus according the second embodiment. Particularly, FIG. 5 shows a logic configuration of the aggregation switch apparatus 500 by sharing the upstream input buffers 412-1 to 412-$n$ and the downstream output buffers 419-1 to 419-$n$ shown in FIG. 4 in one buffer, i.e., a plurality of input/output buffers 512-1 to 512-$n$. In this case, although one buffer with memory bandwidth corresponding to two buffers is sufficient, two buffers are shared, thereby improving memory usage efficiency. Therefore, the configuration illustrated in FIG. 5 is specifically applied for the case of requiring good memory usage efficiency and, can be also applicable to the first embodiment and other foregoing embodiments.

Figure 6:
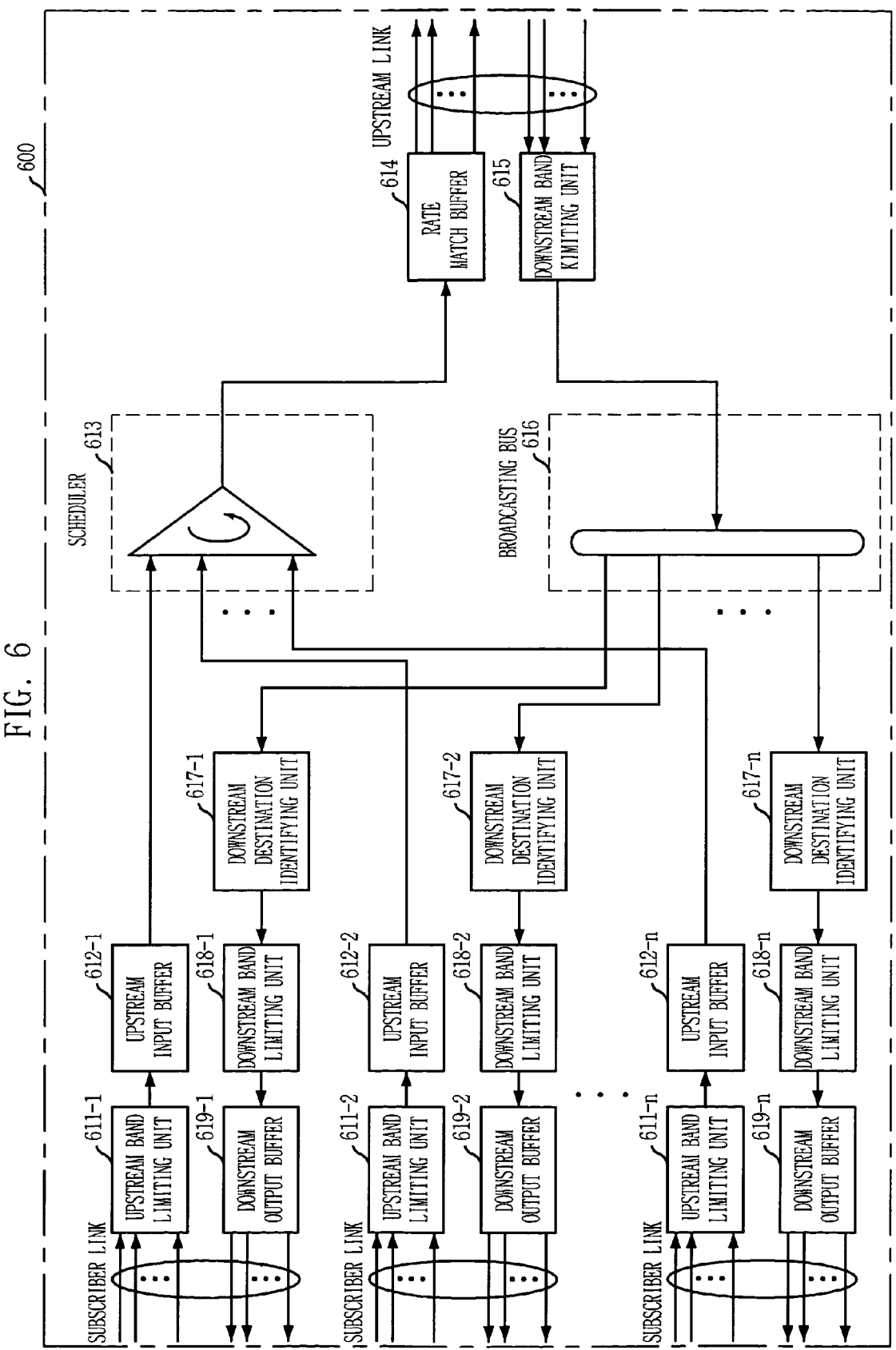
FIG. 6 is a diagram showing a third embodied aggregation switch apparatus for broadband subscribers employing a different mode of identifying a destination of downstream traffic from that described in FIG. 4 in accordance with the present invention.

FIG. 6 is a diagram showing third embodied aggregation switch apparatus for broadband subscribers in accordance with the present invention. The third embodied aggregation switch apparatus adopts a different mode of identifying the downstream traffic. Especially, FIG. 6 shows the configuration specifically for identifying a destination of the downstream traffic by including the same number of downstream destination identifying units 617-1 to 617-n instead of employing the packet selecting units 418-1 to 418-n.

As shown, the aggregation switch apparatus 600 includes: a plurality of upstream band limiting units 611-1 to 611-n for classifying packets received from one or a plurality of subscriber links and limiting a band (rate limiting) according to the classification result; a plurality of upstream input buffers 612-1 to 612-n for storing the packets from the plurality of upstream band limiting units 611-1 to 611-n until the received packets are outputted; a scheduler 613 for aggregating the packets stored into the plurality of upstream input buffers 612-1 to 612-n to one or a plurality of upstream links and scheduling an order of transfer; an upstream rate match buffer 614 for buffering a transfer rate difference between outputs of the upstream input buffers 612-1 to 612-n selected by the scheduler 613 and outputs of the upstream links; a downstream rate match buffer 615 for buffering a transfer rate difference between said one or a number of upstream links and a broadcasting bus 616; the broadcasting bus 616 for transferring the packets from the downstream rate match buffer 615 to terminals of the broadcasting bus 616; a plurality of downstream destination identifying units 617-1 to 617-n for identifying a destination of the individual subscriber links of the received packets by being allocated at each terminal of the broadcasting bus 616 and selecting a corresponding packet; a plurality of downstream band limiting units 618-1 to 618-n for classifying the received packets from the downstream destination identifying units 617-1 to 617-n and limiting a band (rate limiting) according to the classification result; and a plurality of downstream output buffers 619-1 to 619-n for storing the received packets from the downstream band limiting units 618-1 to 618-n until the received packets are outputted to the subscriber links. Herein, the upstream band limiting units 611-1 to 611-n and the downstream band limiting units 618-1 to 618-n are additional configuration elements of the present invention. As mentioned above, n is a positive number.

In the first embodiment of the present invention as explained in FIG. 4, when the packets enter to the upstream links, the downstream destination identifying unit 416 determines a destination port of the corresponding packet and attaches this information to the corresponding packet in the form of a tag. Then, the packet selecting units 418-1 to 418-n allocated at the respective terminals of the broadcasting bus 416 pass the packet arrived at the corresponding destination by using this attached tag. Comparing with this configuration, the aggregation switch apparatus 600 in FIG. 6 undergoes a different mode. That is, the packets enter to the upstream links are not subjected to the destination identification procedure but are transferred through the broadcasting bus 416 to the downstream destination identifying units 417-1 to 417-n allocated at the respective terminals of the broadcasting bus 416. Then, the individual downstream destination identifying units 417-1 to 417-n investigate destination Ethernet addresses of the received packets and, pass the packets corresponding to the correct destination ports and discard those packets that do not correspond to the correct destination ports.

Compared with the configuration depicted in FIG. 4, the aggregation switch apparatus 600 is disadvantageous that it is required to have a plurality of the downstream destination identifying units 417-1 to 417-n at the side of the subscriber links. Despite of this disadvantage, the aggregation switch apparatus 600 is advantageous in that the address learning procedure and the address lookup procedure can be carried out by using one address table per subscriber link. That is, the address table generated through the address learning procedure by one upstream band limiting unit, e.g., a first upstream band limiting unit 611-1, can be used by one downstream destination identifying unit, e.g., a first downstream destination identifying unit 617-1, corresponding to the identical subscriber links. Therefore, on the basis of this configuration, the address learning procedure and the address lookup procedure are carried out by using the one table, yet carried out separately without having overlapped entries, thereby resulting in a burden on communications between these two procedures.

Figure 7:
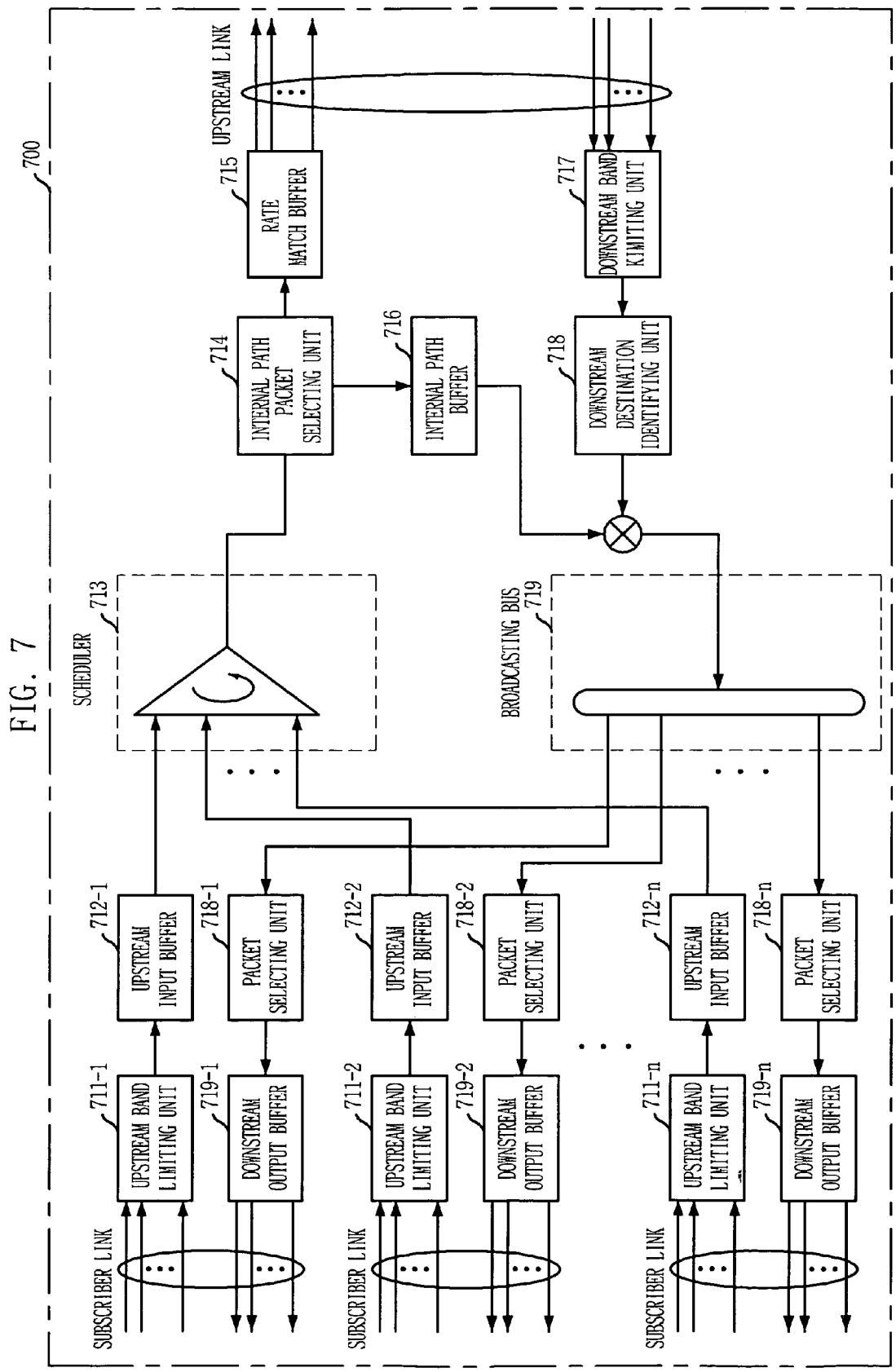
FIG. 7 is a diagram showing a fourth embodied aggregation switch apparatus for broadband subscribers having an internal path for inter-subscriber traffic in accordance with the present invention.

FIG. 7 is a diagram showing a fourth embodied aggregation switch apparatus for broadband subscribers having an internal path for inter-subscriber traffic in addition to the configuration elements described in FIG. 4.

As shown, the aggregation switch apparatus 700 for broadband subscribers includes: a plurality of upstream band limiting units 711-1 to 711-n for classifying packets received from one or a number of subscriber links and limiting a band (rate limiting) according to the classification result; a plurality of upstream input buffers 712-1 to 712-n for storing the received packets from the plurality of upstream band limiting units 711-1 to 711-n until the received packets are outputted; a scheduler 713 for aggregating the packets stored into the plurality of upstream input buffers 712-1 to 712-n to one or a number of upstream links and scheduling an order of transfer; an internal path packet selecting unit 714 for selecting/extracting packets of which destination is one subscriber link by identifying an address of the packet selected by the scheduler 713; an internal path buffer 716 for storing the extracted packets by the internal path packet selecting unit 714; a rate match buffer 715 for buffering a transfer rate difference between upstream packet outputs of the upstream input buffers 712-1 to 712-n selected by the scheduler 713 and outputs of the upstream links; a downstream band limiting unit 717 for classifying the packets received from the upstream links and limiting a band (rate limiting) according to the classification result; a downstream destination identifying unit 718 for identifying destinations of the subscriber links of the packets received from the downstream band limiting unit 717; a broadcasting bus 719 for transferring the packets from the internal path buffer 715 or the downstream destination identifying unit 718 to terminals of the broadcasting bus 719; a plurality of packet selecting units 720-1 to 720-n for identifying destination ports of the subscriber links of the received packets by being allocated at the respective terminals of the broadcasting bus 719 and selecting those packets corresponding to the correct destination ports; and downstream output buffer 721-1 to 721-n for storing the packets received from the plurality of packet selecting units 720-1 to 720-n until the received packets are outputted to the subscriber links. AS like the other embodiments, n is a positive number and the upstream band limiting units 711-1 to 711-n and the downstream band limiting unit 717 are additional configuration elements.

As described above, the internal path packet selecting unit 714 is disposed in front of the rate match buffer 715, and among upstream traffic, traffic flowing towards subscribers is extracted and stored into the internal path buffer 716. At this time, the internal path packet selecting unit 714 uses the same routing table for the downstream destination identifying unit 718 with respect to the downstream traffic.

In more detail of the aforementioned operation, when packets of the upstream traffic arrive at the internal path packet selecting unit 714 through the scheduler 713, referring to the routing table, it is checked whether a destination address of the corresponding packet exists at the routing table. If this destination address is found, a tag expressing the destination is attached to the packet and subsequently, this packet with the tag is stored into the internal path buffer 716. The packet stored into the internal path buffer 716 is transferred to each of the subscribers through the broadcasting bus 719 along with the downstream traffic.

The routing table used in the internal path packet selecting unit 714 and the downstream destination identifying unit 718 is constructed in one table, so that this routing table can be used simultaneously. It is also possible to construct two tables with the same contents for individual usage. As like the configuration described in FIG. 4, the address learning procedure is carried out by using the dispersed source address tables of the upstream band limiting units 711-1 to 711-n.

Figure 8:
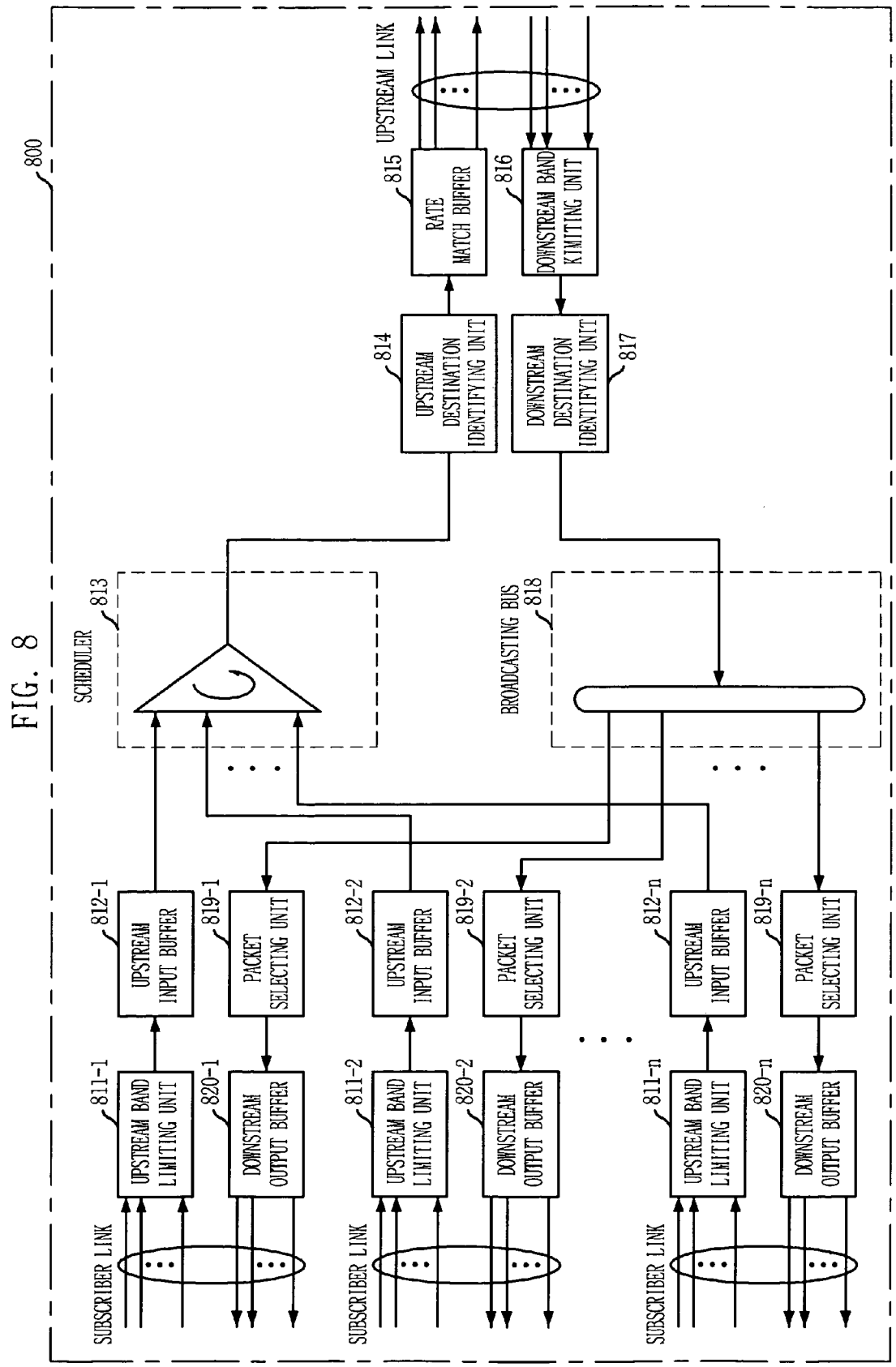
FIG. 8 is a diagram showing a fifth embodied aggregation switch apparatus for broadband subscribers having an upstream destination identifying unit and a downstream destination identifying unit for the case that upstream links have different destinations in accordance with the present invention.

FIG. 8 is a diagram showing a fifth embodiment of an aggregation switch apparatus for broadband subscribers in accordance with the present invention. The aggregation switch apparatus in FIG. 8 specifically includes an upstream destination identifying unit and an upstream output buffer for the case that the upstream links have different destinations.

In the first to the fourth embodiments, it is described that the upstream links are connected with one upper ranked node and the plural number of the upstream links are aggregated together to increase a connection rate with the upper ranked node. However, it is exemplified in the fifth embodiment that the upstream links have a different destination node from each other. At this time, the destination nodes can be different upper ranked nodes or multimedia servers.

As illustrated in FIG. 8, the aggregation switch apparatus 800 for broadband subscribers includes: a plurality of upstream band limiting units 811-1 to 811-n for classifying packets from one or a plurality of subscriber links and limiting a band (rate limiting) according to the classification result; a plurality of upstream input buffers 812-1 to 812-n for storing the received packets from the plurality of upstream band limiting units 811-1 to 811-n until the received packets are outputted; a scheduler 813 for aggregating the packets stored into the plurality of upstream input buffers 812-1 to 812-n to one or a number of upstream links and scheduling an order of transfer; a upstream destination identifying unit 814 for identifying destinations of the upper links of the packets selected by the scheduler 813; an upstream output buffer 815 for storing the packets until the packets are outputted as per the destination assigned by the upstream destination identifying unit 814; a downstream band limiting unit 816 for classifying the packets received from the upper links and limiting a band (rate limiting) according to the classification result; a downstream destination identifying unit 817 for identifying destinations of the subscriber links of the packets received from the downstream band limiting unit 816; a broadcasting bus 818 for transferring the packets from the downstream destination identifying unit 817 to terminals of the broadcasting bus 818; a plurality of packet selecting units 819-1 to 819-n for identifying destination ports of the subscriber links of the received packets by being allocated at the respective terminals of the broadcasting bus 818 and selecting the packets corresponding to the correct destinations of the respective packet selecting units 819-1 to 819-n; and a plurality of downstream output buffers 820-1 to 820-n for storing the packets received from the plurality of packet selecting units 819-1 to 819-n until the received packets are outputted to the subscriber links. Herein, as described the other embodiments, n is a positive number and the upstream band limiting units 811-1 to 811-n and the downstream band limiting unit 816 are additional configuration elements.

Unlike the first to the fourth embodiments, the fifth embodiment requires identifying the destination of the upstream traffic. Thus, the packets passed through the scheduler 813 are transferred through the upstream destination identifying unit 814. At this time, the upstream destination identifying unit 814 finds out the destination with reference to the destination addresses of the packets and then, the packets are stored into the upstream output buffer 815 based on the discovered destination. Also, the packets stored into the upstream output buffer 815 are managed per upstream link and transferred to the respective upstream links by considering priorities between the packets and fairness between the subscribers.

Herein, the upstream destination identifying unit 814 needs to use the routing table to find out the destination with reference to the addresses of the packets transferred towards the upstream. That is, the upstream destination identifying unit 814 includes an upstream routing table in addition to a downstream routing table pertained to the downstream destination identifying unit 817. Also, as like the downstream routing table, the upstream routing table is generated and maintained by the address learning procedure. Hence, to maintain the upstream address table, the downstream destination identifying unit 817 is mandated to look up destination addresses of the downstream packets referring to address of the downstream address table as simultaneously as to learn source addresses of the downstream packets referring to the upstream address table. The address learning procedure for the routing table used by the downstream destination identifying unit 817 is carried out by employing the dispersed source address tables of the upstream band limiting units 811-1 to 811-n.

In short, the configuration disclosed in FIG. 8 requires additionally an address learning procedure with respect to the downstream packets and an address lookup procedure with respect to the upstream packets.

Meanwhile, each of the schedulers 413, 513, 613, 713 and 813 and each of the broadcasting bus 417, 517, 616, 719, and 818 have a constant operation speed that does not change even though the subscriber links increase. The operation speed increases when the number and speed of the upper links increase because the fifth embodied aggregation switch apparatus 800 is configured to include the input buffers for processing the upstream traffic. As a result, even though subscribers increase, an internal operation speed of the aggregation switch apparatus 800 is maintained constant, resulting in capability of accommodating more subscribers with one apparatus.

Also, on the basis of the present invention, it is possible to solve a problem of head-of-line (HOL) blocking that is typically observed when a regular input buffer type switch is used, and the control of this HOL blocking is also simple because the aggregation switch apparatus proposed by the present invention precedently sets the individual transfer paths with the divided upstream traffic and downstream traffic.

Moreover, the upstream input buffers 412-1 to 412-n, 621-1 to 621-n, 712-1 to 712-n and 812-1 to 812-n, downstream output buffers 419-1 to 419-n, 619-1 to 619-n, 721-1 to 721-n and 820-1 to 820-n and input/output buffers 512-1 to 512-n have memory bandwidth that does not change even though the number of subscribers increase.

In addition, in accordance with the embodiments of the present invention, there is a less burden on determination of the destination with checking the address of the packet. As mentioned above, the conventional Ethernet switch undergoes the address learning procedure and the address lookup procedure with respect to all of the packets by using one routing table. Hence, as the number of the subscriber links increases, it is difficult to maintain the routing table in proportion to the increased number of subscriber links and to carry out the address lookup procedure. Thus, extensibility in accommodating subscribers is limited. In contrast to the conventional Ethernet switch, the address lookup procedure is carried out with respect to the downstream traffic, while the address learning procedure is carried out with respect to the upstream traffic by using the dispersed source address tables. As a result, there is a less burden on processing overhead. Therefore, even if the subscriber links increase, there is not a change in the address lookup procedure and the processing overhead with respect to the individual source address tables even though the number of the source address tables with respect to the address learning procedure increases.

Since each of the source address tables stores non-overlapped contents, the size of the individual table is small. Thus, it is possible to reduce a burden on a procedure of determining destinations of the packets.

Also, according to the present invention, it is easier to realize quality of service (QoS) in comparison with the conventional shared buffer type Ethernet switch. In case of the conventional shared buffer type Ethernet switch, all of the procedures related to packets are necessarily processed in a central control manner by being coupled with read and write operations of the shared buffer. Also, it is necessary to design processing procedures with consideration of all possible traffic with respect to the input/output combination. For instance, in case of the Ethernet switch having N number of input/output ports, it is necessary to manage at least $N^2$ number of logic buffers and carry out the QoS with respect to the input/output combinations.

On the contrary, the present invention requires the maximum 2N number of the logic buffers and, this number can be reduced in more extents when the number of subscriber links managed by the input buffers is plural. Also, the band limiting function and the flow control function are processed by being separately classified for each dispersed buffer, thereby easing the burden on the processing of these functions. This effect further results in a reduced burden on the QoS.

Hence, in accordance with the preset invention, it possible to aggregate the upstream traffic of many subscribers to one or a number of the upstream links based on priority and fairness between the subscribers, effectively switch the downstream traffic to many broadband subscribers and cost-effectively process broadcasting traffic. This effect brings out another effect of providing a wide range of services with high function and high scale of integration to more subscribers.

In summary, the aggregation switch apparatus according to the present invention provides several advantages distinguished from the convention Ethernet switch. First, when an apparatus for broadband subscribers with high capacity is configured, required internal switching capacity does not increase in proportion to the number of subscribers but is limited to a band of the upstream link. Also, the packets are stored and processed in a dispersed manner. Therefore, there is a less burden on input/output bands of the memory and the packet processing.

Second, it is possible to effectively process multicasting traffic since the downstream traffic is processed through a broadcasting and subsequent selection mode at the broadcasting bus. Accordingly, the traffic can be effectively aggregated, switched and broadcasted based on characteristics of the subscriber networks and thus, it is further possible to aggregate many subscribers to one apparatus with high scale of integration and high function. This effect results in a reduced cost for constructing the subscriber networks and an improved quality of services.

While the present invention has been described with respect to the particular embodiments, it will be apparent to those skilled in the art that various changes and modifications may be made without departing from the scope of the invention as defined in the following claims.

What is claimed is:

1. An aggregation switch apparatus for broadband subscribers, comprising:
    an upstream input buffering means for buffering packets received from more than one subscriber link;
    a scheduling means for scheduling the packets stored into the upstream input buffering means and transferring the scheduled packet without identifying the destination of the packet;
    a rate match buffering means for buffering a transfer rate difference between an output of the upstream input buffering means scheduled by the scheduling means and an output of said more than one upstream link;
    a downstream destination identifying means for identifying a destination of said more than one subscriber link only of the packets received from said more than one upstream link, wherein said more than one upstream link and said more than one subscriber link are separate sources of packets;
    a broadcasting means for broadcasting the packets received from the downstream destination identifying means to all terminals of the broadcasting means;
    a packet selecting means for selecting a corresponding packet by identifying a destination port of said more than one subscriber link of the received packets though the broadcasting means; and
    a downstream output buffering means for buffering the packets outputted from the packet selecting means to said more than one subscriber link.

2. The aggregation switch apparatus for broadband subscribers as recited in claim 1, wherein the upstream input buffering means and the downstream output buffering means have a logic construction by sharing one physical memory per subscriber link.

3. The aggregation switch apparatus for broadband subscribers as recited in claim 2, wherein the downstream destination identifying means includes a routing table for searching a destined subscriber link by using Ethernet addresses of the packets.

4. An aggregation switch apparatus for broadband subscribers, comprising:
    an upstream band limiting means for classifying packets from more than one subscriber link and limiting a band according to the classification result;
    an upstream input buffering means for buffering the packets received from the upstream band limiting means;
    a scheduling means for scheduling the packets stored into the upstream input buffering means and transferring the scheduled packet without identifying the destination of the packet;
    a rate match buffering means for buffering a transfer rate difference between an output of the upstream input buffering means scheduled by the scheduling means and an output of said more than one upstream link;
    a downstream destination identifying means for identifying a destination of said more than one subscriber link only of the packets received from said more than one upstream link, wherein said more than one upstream link and said more than one subscriber link are separate sources of packets;
a broadcasting means for broadcasting the packets received from the downstream destination identifying means to all terminals of the broadcasting means;
a packet selecting means for selecting a corresponding packet by identifying a destination port of said more than one subscriber link of the received packets through the broadcasting means; and
a downstream output buffering means for buffering the packets outputted from the packet selecting means to said more than one subscriber link.

5. The aggregation switch apparatus for broadband subscribers as recited in claim 4, wherein the upstream input buffering means and the downstream output buffering means have a logic construction by sharing one physical memory per subscriber link.

6. The aggregation switch apparatus for broadband subscribers as recited in claim 5, wherein the downstream destination identifying means includes a routing table for searching a destined subscriber link by using Ethernet addresses of the packets.

7. The aggregation switch apparatus for broadband subscribers as recited in claim 6, wherein the upstream band limiting means investigates addresses of the packets arrived at said more than one subscriber link by using a source address table for each subscriber link and, when a new address is discovered, the upstream band limiting means informs of the new address to the routing table of the downstream destination identifying means.

8. An aggregation switch apparatus for broadband subscribers, comprising:
an upstream input buffering means for buffering packets received from more than one subscriber link;
a scheduling means for aggregating the packets stored into the upstream input buffering means to more than one upstream link and scheduling an order of transfer;
an internal path packet selecting means for selecting/extracting packets destined to said more than one subscriber link by identifying addresses of the selected packets by the scheduling means;
an internal path buffering means for buffering the selected packets by the internal path packet selecting means;
a rate match buffering means for buffering a transfer rate difference between an upstream packet output of the upstream input buffering means scheduled by the scheduling means and an output of said more than one upstream link;
a downstream destination identifying means for identifying a destination of said more than one subscriber link of the packets from said more than one upstream link;
a broadcasting means for transferring the packets from one of the internal path buffering means and the downstream destination identifying means to terminals of the broadcasting means;
a packet selecting means for selecting a corresponding packet by identifying a destination port of said more than one subscriber link of the packets received through the broadcasting means; and
a downstream output buffering means for buffering the packets outputted from the packet selecting means to said more than one subscriber link.

9. The aggregation switch apparatus for broadband subscribers as recited in claim 8, wherein the upstream input buffering means and the downstream output buffering means have a logic construction by sharing one physical memory per subscriber link.

10. The aggregation switch apparatus for broadband subscribers as recited in claim 9, wherein the downstream destination identifying means includes a routing table for searching for a destined subscriber link by using Ethernet addresses of the packets.

11. The aggregation switch apparatus for broadband subscribers as recited in claim 10, wherein the internal path packet selecting means shares the routing table of the downstream destination identifying means.

12. An aggregation switch apparatus for broadband subscribers, comprising:
an upstream band limiting means for classifying packets received from more than one subscriber link and limiting a band according to the classification result;
an upstream input buffering means for buffering the packets from the upstream band limiting means;
a scheduling means for aggregating the packets stored into the upstream input buffering means to more than one upstream link and scheduling an order of transfer;
an internal path packet selecting means for selecting/extracting packets destined to said more than one subscriber link by identifying addresses of the selected packets by the scheduling means;
an internal path buffering means for buffering the selected packets by the internal path packet selecting means;
a rate match buffering means for buffering a transfer rate difference between an upstream packet output of the upstream input buffering means scheduled by the scheduling means and an output of said more than one upstream link;
a downstream band limiting means for classifying the packets from said more than one upstream link and limiting a band according to the classification result;
a downstream destination identifying means for identifying a destination of said more than one subscriber link of the packets from downstream band limiting means;
a broadcasting means for transferring the packets from one of the internal path buffering means and the downstream destination identifying means to terminals of the broadcasting means;
a packet selecting means for selecting a corresponding packet by identifying a destination port of said more than one subscriber link of the packets received through the broadcasting means; and
a downstream output buffering means for buffering the packets outputted from the packet selecting means to said more than one subscriber link.

13. The aggregation switch apparatus for broadband subscribers as recited in claim 12, wherein the upstream input buffering means and the downstream output buffering means have a logic construction by sharing one physical memory per subscriber link.

14. The aggregation switch apparatus for broadband subscribers as recited in claim 13, wherein the downstream destination identifying means includes a routing table for searching for a destined subscriber link by using Ethernet addresses of the packets.

15. The aggregation switch apparatus for broadband subscribers as recited in claim 14, wherein the internal path packet selecting means shares the routing table of the downstream destination identifying means.

16. The aggregation switch apparatus for broadband subscribers as recited in claim 15, wherein the upstream band limiting means investigates addresses of the packets arrived at said more than one subscriber link by using a source address table for each subscriber link and, when a new address is discovered, the upstream band limiting means informs of the new address to the routing table of the downstream destination identifying means.

17. An aggregation switch apparatus for broadband subscribers, comprising:
an upstream input buffering means for buffering packets received from more than one subscriber link;
a scheduling means for aggregating the packets stored into the upstream input buffering means to more than one upstream link and scheduling an order of transfer;
an upstream destination identifying means for identifying a destination of said more than one upstream link of the packets selected by the scheduling means;
an upstream output buffering means for buffering the packets outputted as per destination identified by the upstream destination identifying means;
a downstream destination identifying means for identifying a destination of said more than one subscriber link of the packets received from said more than one upstream link;
a broadcasting means for transferring the packets from the downstream destination identifying means to terminals of the broadcasting means;
a packet selecting means for selecting a corresponding packet by identifying a destination port of said more than one subscriber link of the packets received through the broadcasting means; and
a downstream output buffering means for buffering the packets outputted from the packet selecting means to said more than one subscriber link.

18. The aggregation switch apparatus for broadband subscribers as recited in claim 17, wherein the upstream input buffering means and the downstream output buffering means have a logic construction by sharing one physical memory per subscriber link.

19. The aggregation switch apparatus for broadband subscribers as recited in claim 18, wherein the downstream destination identifying means includes a first routing table for searching for a destined subscriber link by using Ethernet addresses of the packets.

20. The aggregation switch apparatus for broadband subscribers as recited in claim 19, wherein the upstream destination identifying means includes a second routing table for searching for a destined upstream link by using Ethernet addresses of the packets.

21. An aggregation switch apparatus for broadband subscribers, comprising:
an upstream band limiting means for classifying packets received from more than one subscriber link and limiting a band according to the classification result;
an upstream input buffering means for buffering the packets from the upstream band limiting means;
a scheduling means for aggregating the packets stored into the upstream input buffering means to more than one upstream link and scheduling an order of transfer;
an upstream destination identifying means for identifying a destination of more than one upstream link of the packets selected by the scheduling means;
an upstream output buffering means for buffering the packets outputted as per destination identified by the upstream destination identifying means;
a downstream band limiting means for classifying the packets from said more than one upstream link and limiting a band according to the classification result;
a downstream destination identifying means for identifying a destination of said more than one subscriber link of the packets received from the downstream band limiting means;
a broadcasting means for transferring the packets from the downstream destination identifying means to terminals of the broadcasting means;
a packet selecting means for selecting a corresponding packet by identifying a destination port of said more than one subscriber link of the packets from the broadcasting means; and
a downstream output buffering means for buffering the packets outputted from the packet selecting means to said more than one subscriber link.

22. The aggregation switch apparatus for broadband subscribers as recited in claim 21, wherein the upstream input buffering means and the downstream output buffering means have a logic construction by sharing one physical memory per subscriber link.

23. The aggregation switch apparatus for broadband subscribers as recited in claim 22, wherein the downstream destination identifying means includes a first routing table for searching for a destined subscriber link by using Ethernet addresses of the packets.

24. The aggregation switch apparatus for broadband subscribers as recited in claim 23, wherein the upstream destination identifying means includes a second routing table for searching for a destined upstream link by using Ethernet addresses of the packets.

25. The aggregation switch apparatus for broadband subscribers as recited in claim 24, wherein the first routing table of the downstream destination identifying means is constructed by carrying out an address learning procedure for learning addresses of packets transferred towards an upstream at the upstream band limiting means corresponding to the same subscriber link and adding new addresses.

26. The aggregation switch apparatus for broadband subscribers as recited in claim 25, wherein the upstream band limiting means investigates addresses of the packets arrived at said more than one subscriber link by using a source address table for each subscriber link and, when a new address is discovered, the upstream band limiting means informs of the new address to the first routing table of the downstream destination identifying means.

27. An aggregation switch apparatus for broadband subscribers, comprising:
an upstream input buffering means for buffering packets from more than one subscriber link;
a scheduling means for aggregating the packets stored into the upstream input buffering means to more than one upstream link and scheduling an order of transfer;
an upstream rate match buffering means for buffering a transfer rate difference between an output of the upstream input buffering means scheduled by the scheduling means and an output of said more than one upstream link;
a downstream rate match buffering means for buffering a transfer rate difference between said more than one upstream link and a broadcasting means;
the broadcasting means for transferring the packets from the downstream rate match buffering means to terminals of the broadcasting means;
a downstream destination identifying means for selecting a corresponding packet by identifying a destination of said more than one subscriber link of the packets received through the broadcasting means; and a downstream output buffering means for buffering the packets outputted from the downstream destination identifying means to said more than one subscriber link.

28. The aggregation switch apparatus for broadband subscribers as recited in claim 27, wherein the upstream input buffering means and the downstream output buffering means have a logic construction by sharing one physical memory per subscriber link.

29. The aggregation switch apparatus for broadband subscribers as recited in claim 28, wherein the downstream destination identifying means includes a routing table for searching for a destined subscriber link by using Ethernet addresses of the packets.

30. An aggregation switch apparatus for broadband subscribers, comprising:
- an upstream band limiting means for classifying packets from more than one subscriber link and limiting a band according to the classification result;
- an upstream input buffering means for buffering the packets received from the upstream band limiting means;
- a scheduling means for aggregating the packets stored into the upstream input buffering means to more than one upstream link and scheduling an order of transfer;
- an upstream rate match buffering means for buffering a transfer rate difference between an output of the upstream input buffering means scheduled by the scheduling means and an output of said more than one upstream link;
- a downstream rate match buffering means for buffering a transfer rate difference between said more than one upstream link and a broadcasting means;
- the broadcasting means for transferring the packets from the downstream rate match buffering means to terminals of the broadcasting means;
- a downstream destination identifying means for selecting a corresponding packet by identifying a destination of said more than one subscriber link of the packets received through the broadcasting means;
- a downstream band limiting means for classifying the packets from the downstream destination identifying means and limiting a band according to the classification result; and
- a downstream output buffering means for buffering the packets outputted from the downstream band limiting means to said more than one subscriber link.

31. The aggregation switch apparatus for broadband subscribers as recited in claim 30, wherein the upstream input buffering means and the downstream output buffering means have a logic construction by sharing one physical memory per subscriber link.

32. The aggregation switch apparatus for broadband subscribers as recited in claim 30, wherein the downstream destination identifying means includes a routing table for searching for a destined subscriber link by using Ethernet addresses of the packets.

* * * * *